United States Patent
Ito et al.

(10) Patent No.: US 11,967,475 B2
(45) Date of Patent: Apr. 23, 2024

(54) SWITCH DEVICE

(71) Applicant: KABUSHIKI KAISHA TOKAI RIKA DENKI SEISAKUSHO, Aichi (JP)

(72) Inventors: Yutaro Ito, Aichi (JP); Akira Yagihashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 211 days.

(21) Appl. No.: 17/426,289

(22) PCT Filed: Jan. 21, 2020

(86) PCT No.: PCT/JP2020/001858
§ 371 (c)(1),
(2) Date: Jul. 28, 2021

(87) PCT Pub. No.: WO2020/158499
PCT Pub. Date: Aug. 6, 2020

(65) Prior Publication Data
US 2021/0391129 A1  Dec. 16, 2021

(30) Foreign Application Priority Data

Feb. 1, 2019  (JP) ................. 2019-016715

(51) Int. Cl.
*B60J 1/17* (2006.01)
*B60R 11/00* (2006.01)
(Continued)

(52) U.S. Cl.
CPC ............... *H01H 23/14* (2013.01); *B60J 1/17* (2013.01); *B60R 16/02* (2013.01); *H01H 25/065* (2013.01);
(Continued)

(58) Field of Classification Search
CPC ........... H01H 25/065; H01H 2221/016; H01H 23/14; H01H 21/08; H01H 23/06;
(Continued)

(56) References Cited

U.S. PATENT DOCUMENTS 7,268,305 B2 *  9/2007  Schmidt ............... B60N 2/0228
                                                200/1 B
7,750,262 B2 *  7/2010  Knoll .................... H01H 23/04
                                                200/61.54

(Continued)

FOREIGN PATENT DOCUMENTS

FR          3065546 A1     10/2018
JP       2003-039947 A      2/2003
(Continued)

*Primary Examiner* — Anthony R Jimenez
(74) *Attorney, Agent, or Firm* — Studebaker & Brackett PC

(57) ABSTRACT

A switch device includes at least one operating knob to receive an operation for a device to be controlled, a detection unit attached to the operating knob to detect an operation position on the operating knob, and a control unit to control the device to be controlled in response to the operation position detected by the detection unit. The operating knob is in the form of a recognizable shape that allows for recognition of the operation position.

9 Claims, 8 Drawing Sheets

(51) Int. Cl.
    *B60R 16/02*     (2006.01)
    *H01H 23/14*     (2006.01)
    *H01H 25/06*     (2006.01)

(52) U.S. Cl.
    CPC .............. *B60R 2011/0021* (2013.01); *H01H 2221/016* (2013.01)

(58) Field of Classification Search
CPC ......... H01H 2223/004; H01H 2300/01; H01H 2021/225; H01H 25/06; H01H 3/00; H01H 3/02; H01H 3/04; H01H 13/00; H01H 13/12; H01H 13/14; H01H 13/50; H01H 13/22; H01H 13/24; H01H 2003/0293; H01H 2013/50; H01H 2217/00; H01H 2217/004; H01H 2217/006; H01H 2217/01; H01H 2217/012; H01H 2217/018; H01H 2217/024; H01H 2217/028; H01H 2221/00; H01H 2225/01; H01H 2225/024; H01H 2233/00; H01H 2233/002; H01H 2233/004; H01H 2233/006; H01H 2239/006; B60R 16/02; B60R 2011/0021; B60R 11/00; B60J 1/17

USPC ........................................................ 200/339
See application file for complete search history.

(56) References Cited

U.S. PATENT DOCUMENTS

| | | | |
|---|---|---|---|
| 8,994,689 B2 * | 3/2015 | Pandher | E05F 15/46 345/174 |
| 9,966,952 B2 | 5/2018 | Okada et al. | |
| 10,763,053 B2 | 9/2020 | Kosugi et al. | |
| 2017/0070226 A1 | 3/2017 | Okada et al. | |
| 2020/0105482 A1 | 4/2020 | Kosugi et al. | |

FOREIGN PATENT DOCUMENTS

| | | |
|---|---|---|
| JP | 2013-243035 A | 12/2013 |
| JP | 2014-110204 A | 6/2014 |
| JP | 2015-109212 A | 6/2015 |
| WO | 2015/133135 A1 | 9/2015 |
| WO | 2017/122749 A1 | 7/2017 |

* cited by examiner

SWITCH DEVICE

CROSS-REFERENCE TO RELATED APPLICATIONS

The present application is a U.S. National Phase of PCT/JP2020/001858 A1 filed on Jan. 21, 2020, claiming priority to Japanese Patent Application No. 2019-016715 filed on Feb. 1, 2019. The disclosure of the PCT Application is hereby incorporated by reference into the present Application.

TECHNICAL FIELD

The present invention relates to a switch device.

BACKGROUND ART

A vehicle power window switch is known which is used for opening and closing windows of a vehicle (see, e.g., Patent Literature 1).

The vehicle power window switch of Patent Literature 1 has operating knobs to be operated by an operation-performing body, a housing supporting the operating knobs, electrodes provided inside the operating knobs to sense contact of the operation-performing body, and a control unit that is connected to the electrodes and detests contact of the operation-performing body with the operating knobs based on changes in capacitances of the electrodes. Two electrodes corresponding to right and left windows are attached to each operating knob. In addition, a wall portion is provided so as to partition between operating portions of the operating knobs to prevent an operation on a wrong operation position. Thus, the numbers of operating knobs and switches can be reduced.

CITATION LIST

Patent Literature

Patent Literature 1: JP 2015/109212 A

SUMMARY OF INVENTION

Technical Problem

The vehicle power window switch disclosed in Patent Literature 1 may cause a problem that it is not possible to sufficiently save space in the switch device since the wall portion is provided so that an operator can recognize the operation positions corresponding to the left and right windows. That is, there is a demand for further downsizing the switch device.

It is an object of the invention to further downsize the switch device.

Solution to Problem

According to an embodiment of the invention, a switch device according to [1] to [10] below is provided.

[1] A switch device, comprising:
 at least one operating knob to receive an operation for a device to be controlled;
 a detection unit attached to the operating knob to detect an operation position on the operating knob; and
 a control unit to control the device to be controlled in response to the operation position detected by the detection unit,
 wherein the operating knob is in the form of a recognizable shape that allows for recognition of the operation position.

[2] The switch device as defined in [1], wherein the recognizable shape of the operating knob is a shape in which a central portion protrudes relative to both ends along a direction intersecting an operation receiving direction.

[3] The input device as defined in [2], wherein the detection unit comprises sensing portions arranged respectively at the both ends along the direction intersecting the operation receiving direction and detects contact or proximity of a human body.

[4] The switch device as defined in [3], wherein the sensing portion comprises a detection electrode to detect capacitance.

[5] The switch device as defined in any one of [1] to [4], wherein the switch device is mounted on a vehicle, and the operating knobs are arranged side by side in a front-rear direction of the vehicle.

[6] The switch device as defined in [5], wherein the operating knobs are arranged such that at least a part of an operating portion of the operating knob arranged on the rear side in the front-rear direction of the vehicle is positioned higher in a vertical direction of the vehicle than the operating portion of the operating knob arranged on the front side in the front-rear direction of the vehicle.

[7] The switch device as defined in [5] or [6], wherein the operating knob arranged on the front side in the front-rear direction of the vehicle is configured such that a region in which the operating portion of the operating knob arranged on the rear side in the front-rear direction of the vehicle protrudes is in the form of a recess.

[8] The switch device as defined in any one of [1] to [7], wherein the control unit performs control to execute all operations corresponding to a plurality of positions on the operation knob when the detection unit receives a specific operation.

[9] The switch device as defined in any one of [1] to [8], wherein the operating knob is housed and rotatably supported in a recessed portion of a housing, and rotates by receiving a pull-up operation or a push-down operation as the operation.

[10] The switch device as defined in [9], further comprising:
 a knob operation detection unit to detect the pull-up operation or the push-down operation and an operation amount of the operating knob.

Advantageous Effects of Invention

According to an embodiment of the invention, a switch device can be provided that is further downsized.

DESCRIPTION OF EMBODIMENTS

First Embodiment

A switch device 1 in the embodiment of the invention has at least one operating knob 10 to receive operations for devices to be controlled, detection electrodes (20FR, 20FL, 20RR, 20RL) as a detection unit attached to the operating knob 10 to detect an operation position on the operating knob 10, and a control unit 50 to control the devices to be controlled in response to the operation position detected by the detection electrodes (20FR, 20FL, 20RR, 20RL), and it is configured such that the operating knob 10 is in the form of a recognizable shape that allows for recognition of the operation position.

The switch device 1 is mounted on a vehicle 100, can acts as a switch to receive operations for devices to be controlled, and is applicable to various devices. In the first embodiment described below, it is mounted on a vehicle 100 and the devices to be controlled are, e.g., window regulators.

Figure 1:
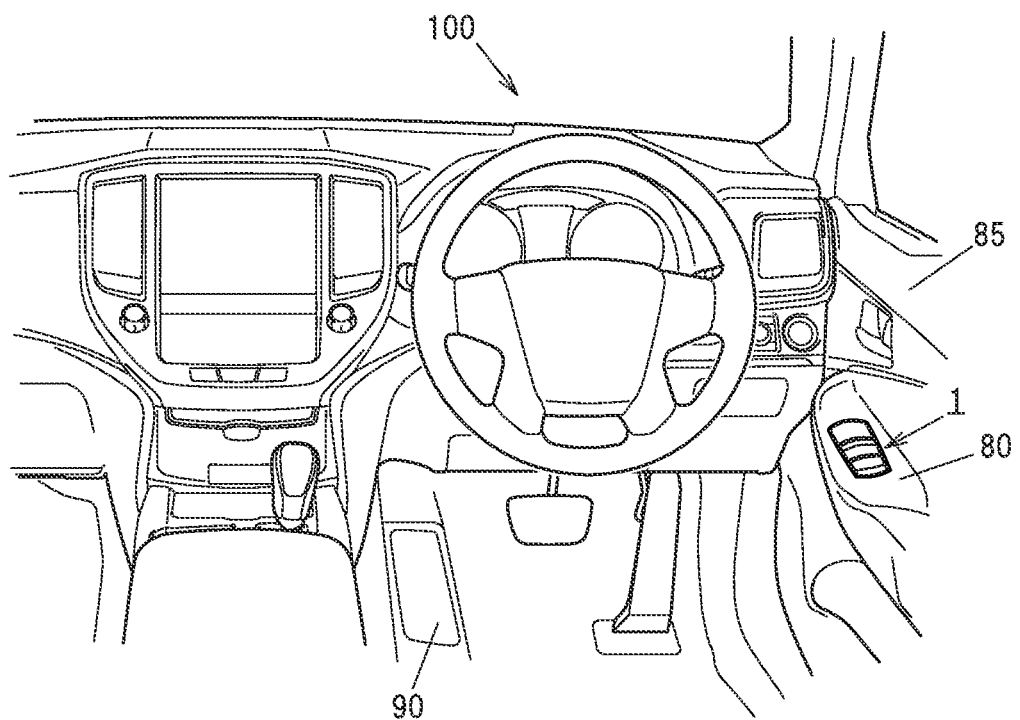
FIG. 1 is a perspective view showing the vicinity of a driver's seat when a switch device in an embodiment of the present invention is mounted on an armrest of the driver side door of a vehicle.

The switch device 1 is mounted on an armrest 80 of a driver side door 85 of the vehicle 100 as shown in FIG. 1 and is to open/close front-side and rear-side windows of the vehicle by controlling the window regulators. The switch device 1 includes sensing portions on the operating knob 10, and the detection electrodes (20FR, 20FL, 20RR, 20RL) to detect capacitance for detecting the operation position (driver side window, front passenger side window, rear right-side window, rear left-side window) are provided on the sensing portions. Since the operating knob 10 provided with the detection electrodes (20FR, 20FL, 20RR, 20RL) is in the form of a recognizable shape that allows for recognition of the operation position, it is not necessary to provide a wall portion, etc., as described for the conventional technique and it is possible to further reduce the size of the switch device.

(The Operating Knob 10)

Figure 2A:
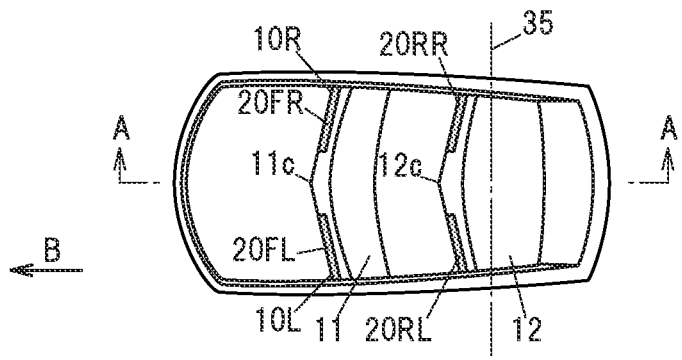
FIG. 2A is a top plan view showing the switch device in the first embodiment of the invention.
Figure 2B:
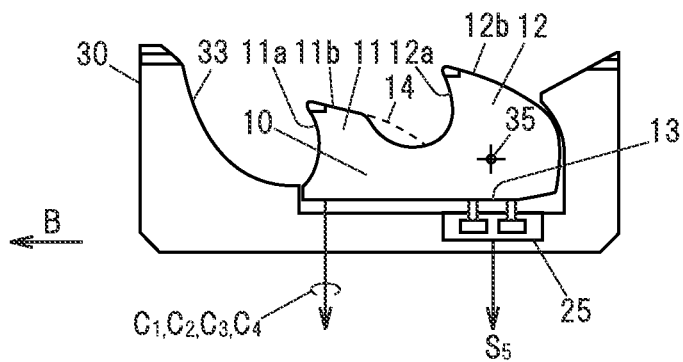
FIG. 2B is a cross sectional view of the switch device taken along a line A-A in FIG. 2A.

As shown in FIGS. 2A and 2B, the operating knob 10 is housed in a recessed portion 33 of a housing 30 and is rotatably supported by a rotating shaft 35. The operating knob 10 is configured such that a front-side operating knob 11 to operate a first operation position (the driver side window and the front passenger side window) and a rear-side operating knob 12 to operate a second operation position (the rear-side windows) are integrally formed.

In the first embodiment, it is mounted so that a direction B shown in FIGS. 2A and 2B coincides with a forward direction of the vehicle.

Figure 2C:
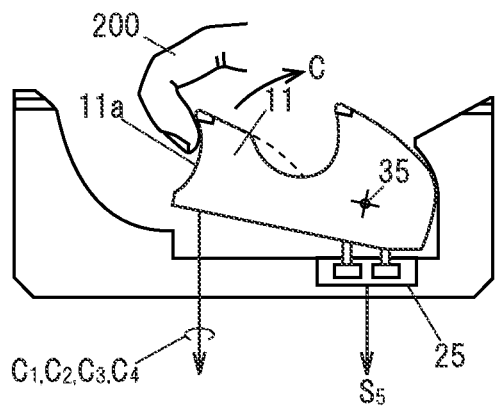
FIG. 2C is a cross sectional view showing the switch device in the first embodiment of the invention when pulling up a front-side operating knob.

As shown in FIGS. 2B and 2C, a recessed operation surface 11a to facilitate a pull-up operation of the operating knob by a finger 200 is formed on a front surface of the front-side operating knob 11 (a surface facing in the direction B). It is thus easy to perform the pull-up operation in a direction C about the rotating shaft 35 shown in FIG. 2C.

Figure 2D:
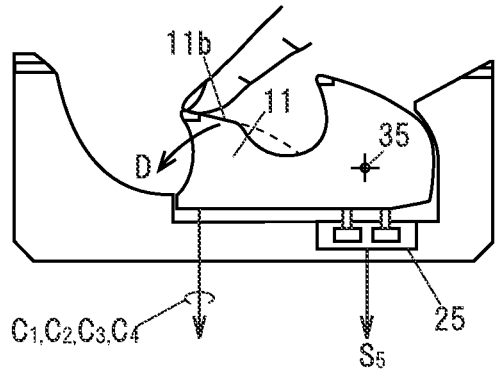
FIG. 2D is a cross sectional view showing the switch device in the first embodiment of the invention when pushing down the front-side operating knob.

Meanwhile, a pressing operation surface 11b to facilitate a push-down operation of the operating knob by the finger 200 is formed on an upper surface of the front-side operating knob 11 (a surface facing in an upward direction of the vehicle), as shown in FIGS. 2B and 2D. It is thus easy to perform the push-down operation in a direction D about the rotating shaft 35 shown in FIG. 2D.

Similarly, a recessed operation surface 12a and a pressing operation surface 12b are also formed on front and upper surfaces of the rear-side operating knob 12, as shown in FIG. 2B.

A lower portion 13 of the operating knob 10 is a detection portion where a knob operation amount detection sensor 25 detects an operation amount of the operating knob 10. By the pull-up operation or push-down operation as described above, the lower portion 13 of operating knob 10 moves relative to the knob operation amount detection sensor 25. It is thus possible to detect the operation amount and operation direction of the operating knob 10.

The operating knob 10 is in the form of a recognizable shape that allows for recognition of the operation position (the driver side window, the front passenger side window, the rear right-side window, the rear left-side window). Particularly, it is formed in a shape that allows for recognition of the right side and the left side with respect to the forward direction of the vehicle (the direction B shown in FIG. 2A). Hence, the recognizable shape of the operating knob 10 is a shape in which a central portion protrudes relative to both ends along a direction intersecting an operation receiving direction. A protruding direction of the protrusion may be toward the front along the entire length direction of the vehicle or may be an upward direction along a height direction of the vehicle.

In FIG. 2A, a central portion 11c of the front-side operating knob 11 and a central portion 12c of the rear-side operating knob 12 are formed in a protruding shape. The operator (driver), when touching the front-side operating knob 11 or the rear-side operating knob 12 with the finger 200, recognizes the central portion 11c or the central portion 12c having a protruding shape and can thereby easily recognize the right side or the left side.

The above is an example of the shape that allows for recognition of the operation position, and shapes other than the raised shape, such as an arc shape, a recessed shape or a notch shape, can be applied to the operating knob in the first embodiment as long as it allows for recognition of the operation position.

The operating knob 10 is also configured such that at least a part of an operating portion of the operating knob arranged on the rear side in the front-rear direction of the vehicle 100 is positioned higher in a vertical direction of the vehicle 100 than the operating portion of the operating knob arranged on the front side in the front-rear direction of the vehicle 100. That is, at least a part of the operating portion (the recessed operation surface 12a, the pressing operation surface 12b) of the rear-side operating knob 12 is positioned higher than the operating portion (the recessed operation surface 11a, the pressing operation surface 11b) of the front-side operating knob 11 shown in FIG. 2B. This allows the operator to easily recognize whether he/she is operating the front side or the rear side of the operating knob 10.

In addition, in the operating knob 10, the operating knob arranged on the front side in the front-rear direction of the vehicle 100 is configured such that a region in which the operating portion of the operating knob arranged on the rear side in the front-rear direction of the vehicle 100 protrudes is in the form of a recess. As shown in FIG. 2B, a region 14 in which the operating portion of the operating knob protrudes is in the form of a recess between the front-side operating knob 11 and the rear-side operating knob 12. That is, the region 14 is in the form of a recess and does not protrude in a direction toward the rear-side operating knob 12. Thus, it is also easy to operate the rear-side operating knob 12, a space between the front-side operating knob 11 and the rear-side operating knob 12 can be reduced and it is possible to reduce the size of the switch device 1 in the front-rear direction.

(The Detection Electrodes 20FR, 20FL, 20RR, 20RL)

The switch device 1 includes the sensing portions respectively arranged on both ends along the direction intersecting the operation receiving direction to detect contact or proximity of a human body. In the first embodiment, the sensing portions are detection electrodes as the detection unit to detect the operation position on the operating knob 10 and are the detection electrodes (20FR, 20FL, 20RR, 20RL) that detect capacitance. The detection electrodes (20FR, 20FL, 20RR, 20RL) detect capacitance values $C_1$, $C_2$, $C_3$, $C_4$, which change due to contact or proximity of a finger, etc., of the operator, and output them to the control unit 50.

As shown in FIG. 2A, the detection electrodes 20FR, 20RR are respectively attached to the front-side operating knob 11 and the rear-side operating knob 12 on a right end side 10R. Meanwhile, the detection electrodes 20FL, 20RL are respectively attached to the front-side operating knob 11 and the rear-side operating knob 12 on a left end side 10L. All the detection electrodes (20FR, 20FL, 20RR, 20RL) are attached in such a manner that at least a part of the finger 200 comes into contact therewith or comes close thereto when the pull-up operation shown in FIG. 2C or the push-down operation shown in FIG. 2D is performed.

(The Knob Operation Amount Detection Sensor 25)

As shown in FIG. 2B, the knob operation amount detection sensor 25 is provided at a lower portion of the housing 30 to detect the operation amount of the operating knob 10. The knob operation amount detection sensor 25 only needs to be a sensor that detects the pull-up operation amount and the push-down operation amount of the operating knob 10 (the front-side operating knob 11, the rear-side operating knob 12).

The knob operation amount detection sensor 25 may be a switch that outputs ON and OFF signals respectively by a pull-up operation and a push-down operation of the operating knob 10 (the front-side operating knob 11, the rear-side operating knob 12). Alternatively, the knob operation amount detection sensor 25 may be a detection sensor that outputs an analog output and a digital output in response to the pull-up operation amount and the push-down operation amount of the operating knob 10 (the front-side operating knob 11, the rear-side operating knob 12). The knob operation amount detection sensor 25 can be a switch or a detection sensor that outputs a signal required by the window regulator.

(The Housing 30)

The housing 30 houses and rotatably supports the operating knob 10 in the recessed portion 33, as shown in FIG. 2B, etc. In addition, the housing 30 includes the knob operation amount detection sensor 25.

As shown in FIG. 1, the housing 30 is mounted on the armrest 80 of the driver side door 85 of the vehicle 100. The housing 30 can alternatively be mounted on a floor console 90 shown in FIG. 1. Mounting the housing 30, i.e., the switch device 1, on the floor console 90 has an effect that, e.g., a harness for wiring can be shorter or it is possible to also operate from the front passenger seat side.

(The Control Unit 50)

The control unit 50 receives an input signal, then outputs a control signal $S_{10}$ according to a predetermined program, and thereby controls opening/closing of the windows of the vehicle via the window regulators. The control unit 50 includes, e.g., a microcomputer composed of a CPU (Central Processing Unit) performing calculation and processing, etc., of the acquired data according to a stored program, and a RAM (Random Access Memory) and a ROM (Read Only Memory) as semiconductor memories, etc. A current driver, etc., to drive the window regulator can also be provided.

Figure 3:
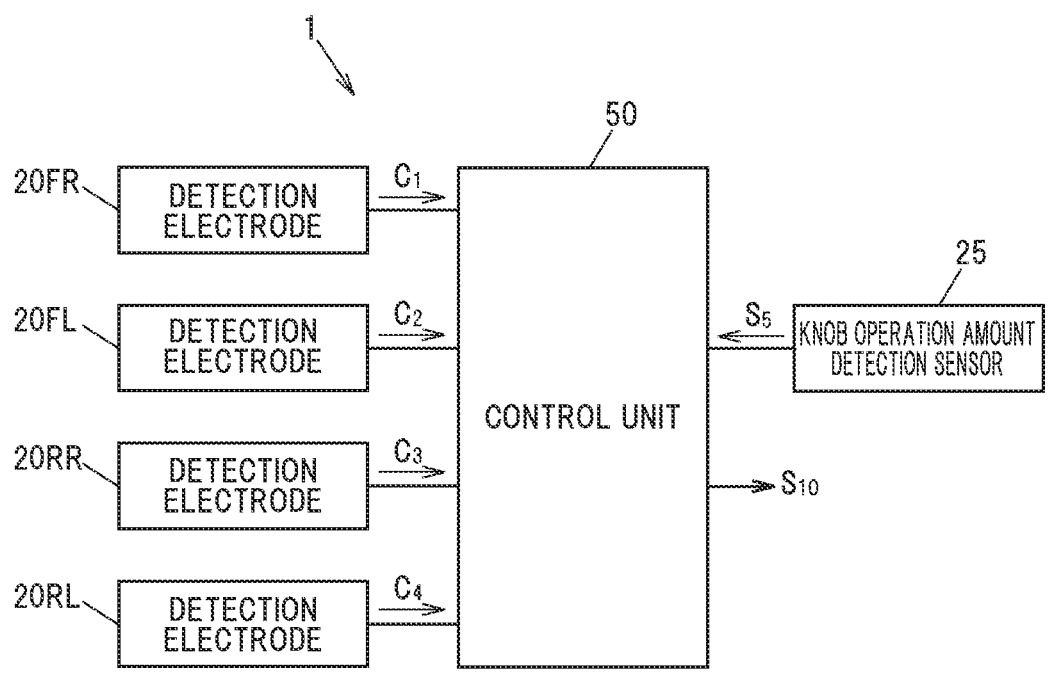
FIG. 3 is a block diagram illustrating a configuration of the switch device in the first embodiment of the invention.

As shown in FIG. 3, the control unit 50 is connected to the detection electrodes (20FR, 20FL, 20RR, 20RL), and the respective electrode capacitance values $C_1$, $C_2$, $C_3$, $C_4$ detected by the detection electrodes (20FR, 20FL, 20RR, 20RL) are input. The knob operation amount detection sensor 25 is also connected, and detection information $S_5$ about a pull-up operation or a push-down operation of the operating knob 10 is input. In addition, the control signal $S_{10}$ is calculated and output according to a predetermined program.

(Operation of the Switch Device 1)

Figure 4:
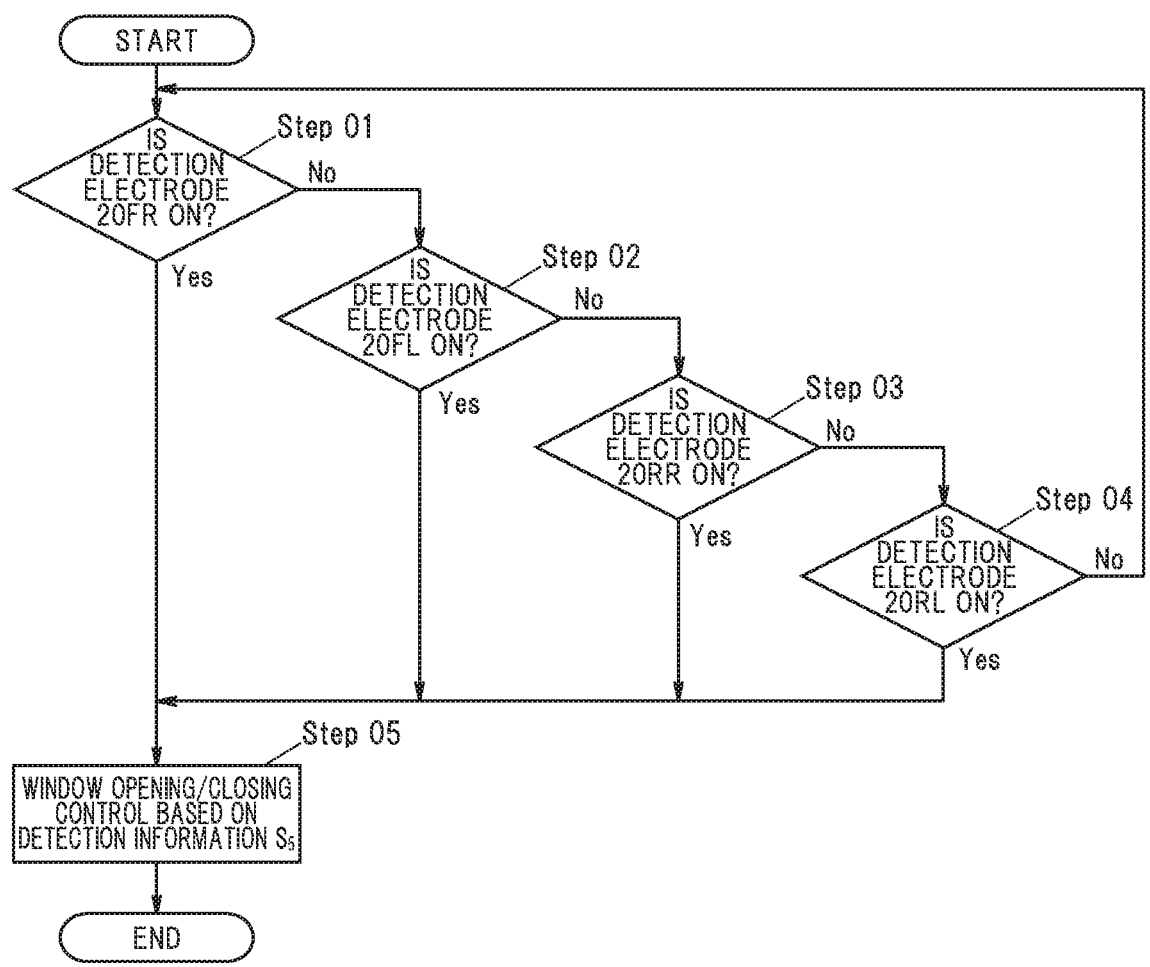
FIG. 4 is an explanatory flowchart showing the operation of the switch device in the first embodiment of the invention.

The operation of the switch device 1 will be described with the flowchart of the switch device in the first embodiment shown in FIG. 4.

(Step 01)

Based on the capacitance value $C_1$ input from the detection electrode 20FR, the control unit 50 determines whether the detection electrode 20FR is ON. The control unit 50 has, e.g., a predetermined threshold Cth for determining contact or proximity of a finger, etc., to the detection electrode. The control unit 50 can determine that the detection electrode 20FR is ON, i.e., an operation has been performed on the operation position to which the detection electrode 20FR is attached (the driver side window), by comparing the capacitance value $C_1$ with the Cth. The process proceeds to Step 05 when the detection electrode 20FR is ON (Step 01: Yes), and the process proceeds to Step 02 when the detection electrode 20FR is not ON (Step 01: No).

(Step 02)

Based on the capacitance value $C_2$ input from the detection electrode 20FL, the control unit 50 determines whether the detection electrode 20FL is ON. The control unit 50 can determine that the detection electrode 20FL is ON, i.e., an operation has been performed on the operation position to which the detection electrode 20FL is attached (the front passenger side window), by comparing the capacitance value $C_2$ with the Cth. The process proceeds to Step 05 when the detection electrode 20FL is ON (Step 02: Yes), and the process proceeds to Step 03 when the detection electrode 20FL is not ON (Step 02: No).

(Step 03)

Based on the capacitance value $C_3$ input from the detection electrode 20RR, the control unit 50 determines whether the detection electrode 20RR is ON. The control unit 50 can determine that the detection electrode 20RR is ON, i.e., an operation has been performed on the operation position to which the detection electrode 20RR is attached (the rear right-side window), by comparing the capacitance value $C_3$ with the Cth. The process proceeds to Step 05 when the detection electrode 20RR is ON (Step 03: Yes), and the process proceeds to Step 04 when the detection electrode 20RR is not ON (Step 03: No).

(Step 04)

Based on the capacitance value $C_4$ input from the detection electrode 20RL, the control unit 50 determines whether the detection electrode 20RL is ON. The control unit 50 can determine that the detection electrode 20RL is ON, i.e., an operation has been performed on the operation position to which the detection electrode 20RL is attached (the rear left-side window), by comparing the capacitance value $C_4$ with the Cth. The process proceeds to Step 05 when the detection electrode 20RL is ON (Step 04: Yes), and the process returns to Step 01 when the detection electrode 20RL is not ON (Step 04: No).

(Step 05)

The control unit 50 controls opening/closing of the window of the vehicle via the window regulator by outputting the control signal $S_{10}$ based on the detection information $S_5$ about the pull-up operation or push-down operation of the operating knob 10. That is, the operation position is identified by the detection electrode, and an opening operation or a closing operation of the window corresponding to the operation position (driver side, front passenger side, rear right-side, rear left-side) is controlled based on the detection information $S_5$.

The operation of the switch device 1 ends after the above-described series of steps. However, the operation described above can be repeatedly executed as necessary.

Second Embodiment

Figure 5A:
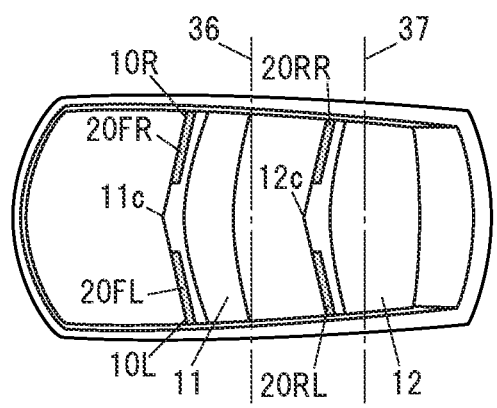
FIG. 5A is a top plan view showing the switch device in the second embodiment of the invention.
Figure 5B:
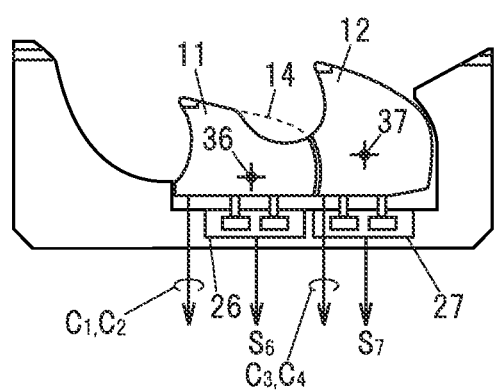
FIG. 5B is a cross sectional view taken along line A-A showing the switch device shown in FIG. 5A.

In the switch device 1 according to the second embodiment of the invention, the front-side operating knob 11 and the rear-side operating knob 12 of the operating knob 10 are provided independently from each other, as shown in FIGS. 5A and 5B. The operating knob 10 is housed in the recessed portion 33 of the housing 30 and is rotatably supported respectively by rotating shafts 36, 37, as shown in FIGS. 5A and 5B. The operating knob 10 is configured such that the front-side operating knob 11 to operate the first operation position (the driver side window) and the rear-side operating knob 12 to operate the second operation position (the rear-side windows) are provided independently from each other.

As shown in FIG. 5B, the detection electrodes 20FR, 20FL are attached to the front-side operating knob 11 respectively on the right end side 10R and the left end side 10L. The detection electrodes (20FR, 20FL) detect the capacitance values $C_1$, $C_2$, which change due to contact or proximity of a finger, etc., of the operator, and output them to the control unit 50.

Meanwhile, as shown in FIG. 5B, the detection electrodes 20RR, 20RL are attached to the rear-side operating knob 12 respectively on the right end side 10R and on the left end side 10L. The detection electrodes (20RR, 20RL) detect the capacitance values $C_3$, $C_4$, which change due to contact or proximity of a finger, etc., of the operator, and output them to the control unit 50.

As shown in FIG. 5B, knob operation amount detection sensors 26, 27 are provided at the lower portion of the housing 30 to detect the respective operation amounts of the front-side operating knob 11 and the rear-side operating knob 12. The knob operation amount detection sensors 26, 27 output detection information $S_6$ and $S_7$ about the pull-up operation or push-down operation of the front-side operating knob 11 and the rear-side operating knob 12 to the control unit 50.

Figure 6:
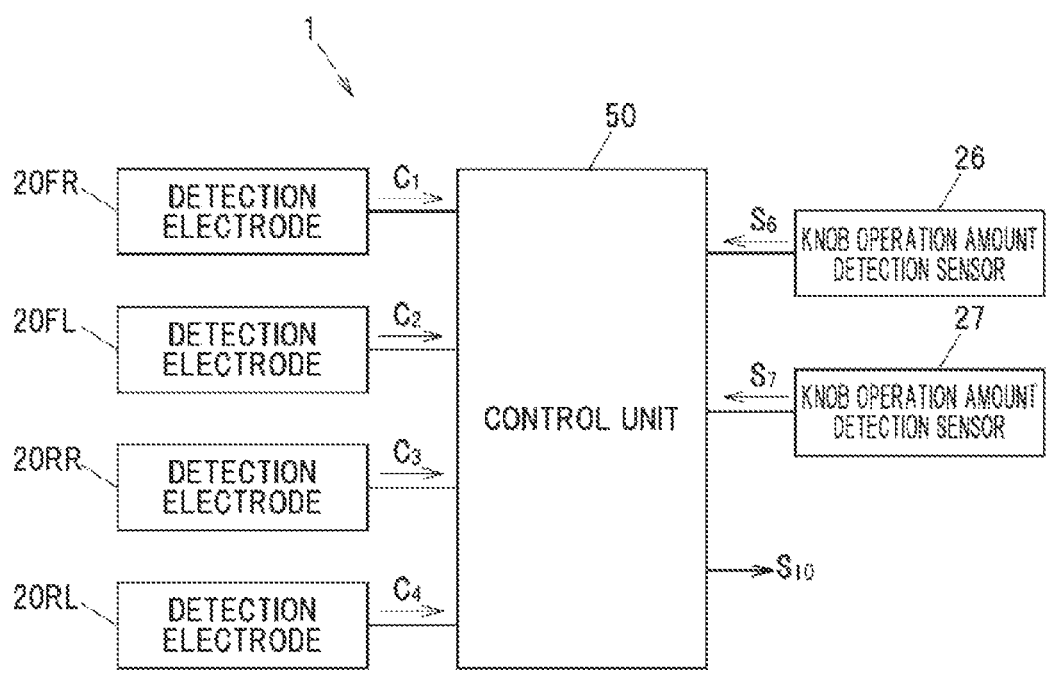
FIG. 6 is a block diagram illustrating a configuration of the switch device in the second embodiment of the invention.

As shown in FIG. 6, the control unit 50 is connected to the detection electrodes (20FR, 20FL, 20RR, 20RL), and the respective electrode capacitance values $C_1$, $C_2$, $C_3$, $C_4$ detected by the detection electrodes (20FR, 20FL, 20RR, 20RL) are input. The knob operation amount detection sensors 26, 27 are also connected, and the detection information $S_6$ and $S_7$ about the pull-up operation or push-down operation of the operating knob 10 are input.

The remaining configuration is the same as in the first embodiment.

(Operation of the Switch Device 1)

Figure 7:
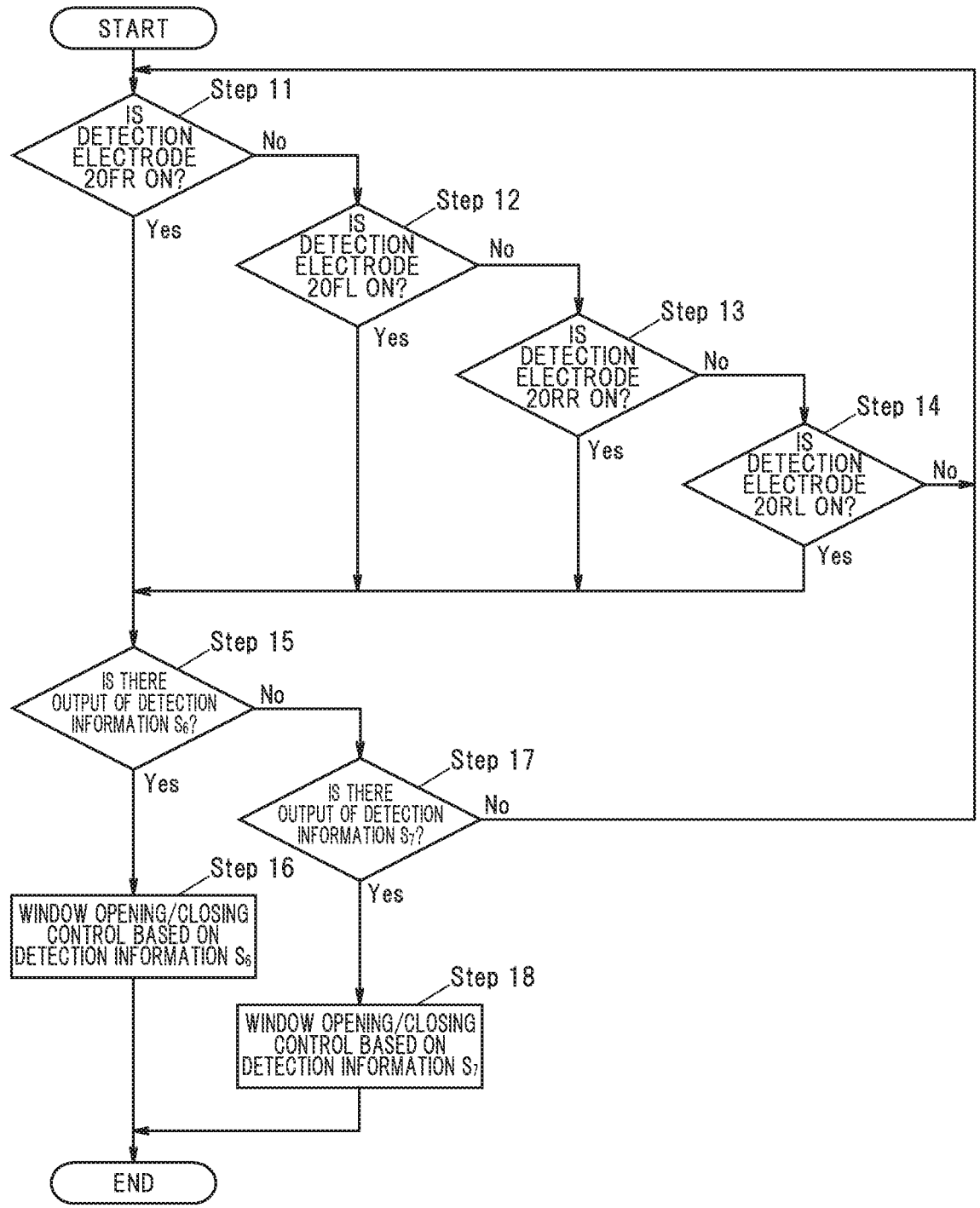
FIG. 7 is an explanatory flowchart showing the operation of the switch device in the second embodiment of the invention.

The operation of the switch device 1 will be described with the flowchart of the switch device in the second embodiment shown in FIG. 7.

(Step 11)

Based on the capacitance value $C_1$ input from the detection electrode 20FR, the control unit 50 determines whether the detection electrode 20FR is ON. The control unit 50 has, e.g., a predetermined threshold Cth for determining contact or proximity of a finger, etc., to the detection electrode. The control unit 50 can determine that the detection electrode 20FR is ON, i.e., an operation has been performed on the operation position to which the detection electrode 20FR is attached (the driver side window), by comparing the capacitance value $C_1$ with the Cth. The process proceeds to Step 15 when the detection electrode 20FR is ON (Step 11: Yes), and the process proceeds to Step 12 when the detection electrode 20FR is not ON (Step 11: No).

(Step 12)

Based on the capacitance value $C_2$ input from the detection electrode 20FL, the control unit 50 determines whether the detection electrode 20FL is ON. The control unit 50 can determine that the detection electrode 20FL is ON, i.e., an operation has been performed on the operation position to which the detection electrode 20FL is attached (the front passenger side window), by comparing the capacitance value $C_2$ with the Cth. The process proceeds to Step 15 when the detection electrode 20FL is ON (Step 12: Yes), and the process proceeds to Step 13 when the detection electrode 20FL is not ON (Step 12: No).

(Step 13)

Based on the capacitance value $C_3$ input from the detection electrode 20RR, the control unit 50 determines whether the detection electrode 20RR is ON. The control unit 50 can determine that the detection electrode 20RR is ON, i.e., an operation has been performed on the operation position to which the detection electrode 20RR is attached (the rear right-side window), by comparing the capacitance value $C_3$ with the Cth. The process proceeds to Step 15 when the detection electrode 20RR is ON (Step 13: Yes), and the process proceeds to Step 14 when the detection electrode 20RR is not ON (Step 13: No).

(Step 14)

Based on the capacitance value $C_4$ input from the detection electrode 20RL, the control unit 50 determines whether the detection electrode 20RL is ON. The control unit 50 can determine that the detection electrode 20RL is ON, i.e., an operation has been performed on the operation position to which the detection electrode 20RL is attached (the rear left-side window), by comparing the capacitance value $C_4$ with the Cth. The process proceeds to Step 15 when the detection electrode 20RL is ON (Step 14: Yes), and the process returns to Step 11 when the detection electrode 20RL is not ON (Step 14: No).
(Step 15)

The control unit 50 determines whether there is an output of the detection information $S_6$ about the pull-up operation or push-down operation of the front-side operating knob 11. The process proceeds to Step 16 when there is an output of the detection information $S_6$ (Step 15: Yes), and the process proceeds to Step 17 when there is not an output of the detection information $S_6$ (Step 15: No).
(Step 16)

The control unit 50 controls opening/closing of the window of the vehicle via the window regulator by outputting the control signal $S_{10}$. That is, the operation position is identified by the detection electrode, and an opening operation or a closing operation of the window corresponding to the operation position (driver side, front passenger side) is controlled based on the detection information $S_6$.
(Step 17)

The control unit 50 determines whether there is an output of the detection information $S_7$ about the pull-up operation or push-down operation of the rear-side operating knob 12. The process proceeds to Step 18 when there is an output of the detection information $S_7$ (Step 17: Yes), and the process returns to Step 11 when there is not an output of the detection information $S_7$ (Step 17: No).
(Step 18)

The control unit 50 controls opening/closing of the window of the vehicle via the window regulator by outputting the control signal $S_{10}$. That is, the operation position is identified by the detection electrode, and an opening operation or a closing operation of the window corresponding to the operation position (rear right-side, rear left-side) is controlled based on the detection information $S_7$.

The operation of the switch device 1 ends after the above-described series of steps. However, the operation described above can be repeatedly executed as necessary.

Third Embodiment

The switch device 1 in the third embodiment of the invention is configured such that the control unit 50 performs control to execute all operations corresponding to the plural positions on the operation knob when the detection unit (20FR, 20FL, 20RR, 20RL) receives a specific operation. That is, when a specific operation such as a double tap or a tracing operation is performed on the detection unit (20FR, 20FL, 20RR, 20RL), all the opening/closing operations of all the driver side, front passenger side, rear right-side, rear left-side windows are executed, as an example.

The remaining configuration is the same as in the first embodiment.
(Operation of the Switch Device 1)

The operation of the switch device 1 will be described with the flowchart of the switch device in the third embodiment shown in FIG. 8.

Figure 8:
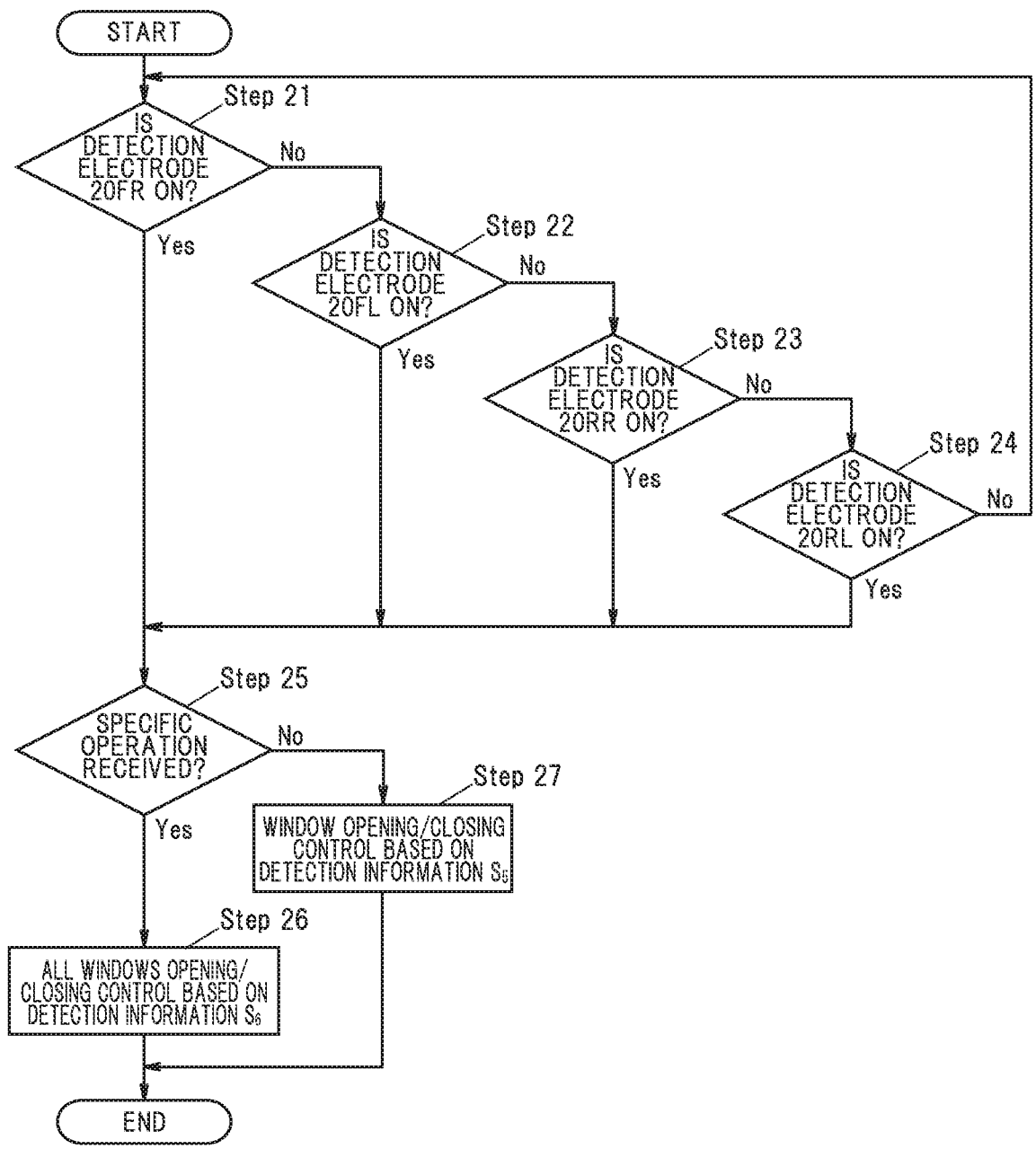
FIG. 8 is an explanatory flowchart showing the operation of the switch device in the third embodiment of the invention.

Steps 21 to 24 shown in FIG. 8 are the same as in the first embodiment, and the description thereof will be omitted.
(Step 25)

The control unit 50 determines whether the detection unit (20FR, 20FL, 20RR, 20RL) has received a specific operation. The specific operation is, e.g., a double tap or a tracing operation, etc. As for the determination of whether having received a specific operation, determination of various specific operations can be made by converting determination of a double tap or determination of a tracing operation, etc., into a function as, e.g., a library and referring to the function.

The process proceeds to Step 26 when received the specific operation (Step 25: Yes), and the process proceeds to Step 27 when not received the specific operation (Step 25: No).
(Step 26)

The control unit 50 controls opening/closing of all the window of the vehicle via the window regulators by outputting the control signal $S_{10}$ based on the detection information $S_5$ about the pull-up operation or push-down operation of the operating knob 10. That is, an opening operation or a closing operation of all the window is controlled based on the detection information $S_5$.
(Step 27)

The control unit 50 controls opening/closing of the window of the vehicle via the window regulator by outputting the control signal $S_{10}$ based on the detection information $S_5$ about the pull-up operation or push-down operation of the operating knob 10. That is, the operation position is identified by the detection electrode, and an opening operation or a closing operation of the window corresponding to the operation position (driver side, front passenger side, rear right-side, rear left-side) is controlled based on the detection information $S_5$.

The operation of the switch device 1 ends after the above-described series of steps. However, the operation described above can be repeatedly executed as necessary.

Effects of the Embodiments (1) The switch device 1 in the present embodiments includes sensing portions on the operating knob 10, and the detection electrodes (20FR, 20FL, 20RR, 20RL) to detect capacitance for detecting the operation position (the driver side window, the front passenger side window, the rear right-side window, the rear left-side window) are provided on the sensing portions. Since the operating knob 10 provided with the detection electrodes (20FR, 20FL, 20RR, 20RL) is in the form of a recognizable shape that allows for recognition of the operation position, it is not necessary to provide a wall portion, etc., as described for the conventional technique and it is possible to further reduce the size of the switch device.

(2) The operating knob 10 is in the form of a recognizable shape that allows for recognition of the operation position (the driver side window, the front passenger side window, the rear right-side window, the rear left-side window). As shown in FIG. 2A, the central portion 11c of the front-side operating knob 11 and the central portion 12c of the rear-side operating knob 12 are formed in a protruding shape. The operator (driver), when touching the front-side operating knob 11 or the rear-side operating knob 12 with the finger 200, recognizes the central portion 11c or 12c having a protruding shape and can thereby easily recognize the right side or the left side.

(3) In the switch device 1 in the present embodiments, at least a part of the operating portion (the recessed operation surface 12a, the pressing operation surface 12b) of the rear-side operating knob 12 is positioned higher than the operating portion (the recessed operation surface 11a, the pressing operation surface 11b) of the front-side operating knob 11. This allows the operator to easily recognize whether he/she is operating the front side or the rear side of the operating knob 10.

(4) In addition, as shown in FIG. 2B, the region 14 in which the operating portion of the operating knob protrudes is in the form of a recess between the front-side operating knob 11 and the rear-side operating knob 12. That is, the region 14 is in the form of a recess and does not protrude in the direction toward the rear-side operating knob 12. Thus, it is also easy to operate the rear-side operating knob 12, a space between the front-side operating knob 11 and the rear-side operating knob 12 can be reduced and it is possible to reduce the size of the switch device 1 in the front-rear direction.

(5) From the above, it is possible to achieve a small window regulator switch with a single knob.

(6) By detecting left and right using the capacitance raised in the operation knob, it is possible to switch between left and right with a single operation knob. This allows space to be saved in terms of the right-left width. In addition, by combining a physical switch with the capacitance, it can be used with an operation feeling close to the conventional feeling of use. By forming the tip of the operation knob in a mountain shape, whether the touching position is left or right can be known by sensation to the finger. These can be done by one finger, hence, a switch device designed in consideration of the way of moving during the operation (in consideration of smartness) is realized.

(7) According to the third embodiment, all the opening/closing operations of all the driver side, front passenger side, rear right-side, rear left-side windows can be simultaneously executed upon determination that the detection unit (20FR, 20FL, 20RR, 20RL) has received a specific operation.

Although some embodiments and modifications of the invention have been described, these embodiments and modifications are merely examples and the invention according to claims is not to be limited thereto. These new embodiments and modifications may be implemented in various other forms, and various omissions, substitutions and changes, etc., can be made without departing from the gist of the invention. In addition, all combinations of the features described in these embodiments and modifications are not necessary to solve the problem of the invention. Further, these embodiments and modifications are included within the scope and gist of the invention and also within the invention described in the claims and the range of equivalency.

REFERENCE SIGNS LIST

1 SWITCH DEVICE
10 OPERATING KNOB
11c CENTRAL PORTION
12c CENTRAL PORTION
20FL, 20FR, 20RL, 20RR DETECTION ELECTRODE
25, 26, 27 KNOB OPERATION AMOUNT DETECTION SENSOR
30 HOUSING
33 RECESSED PORTION
50 CONTROL UNIT

The invention claimed is:

1. A switch device, comprising:
at least one operating knob mounted on a vehicle for receiving an operation for a device to be controlled;
a detection unit having sensing portions attached to the operating knob to detect an operation position on the operating knob;
a housing in a recessed portion of which the operating knob is housed and rotatably supported; and
a control unit to control the device to be controlled in response to the operation position detected by the detection unit,
wherein the operating knob comprises a central portion protruding relative to both ends along a direction intersecting an operation receiving direction and rotates by receiving a pull-up operation or a push-down operation as the operation, and
wherein the at least one operating knob is arranged in a front-rear direction of the vehicle such that an operating portion of the operating knob arranged on a rear side in the front-rear direction is positioned at a different height in a vertical direction of the vehicle than an operating portion of the operating knob arranged on a front side in the front-rear direction, and each of the operating portions includes a sensing portion.

2. The switch device according to claim 1, wherein the at least one operating knob arranged on the front side in the front-rear direction of the vehicle is configured such that a region in which the operating portion of the operating knob arranged on the rear side in the front-rear direction of the vehicle protrudes is in the form of a recess.

3. The switch device according to claim 1, wherein the control unit performs control to execute all operations corresponding to a plurality of positions on the operation knob when the detection unit receives a specific operation.

4. The switch device according to claim 1, wherein the detection unit detects a pull-up operation or a push-down operation and an operation amount of the operating knob.

5. The switch device according to claim 1, wherein the operating knob includes a recess between the rear side and front side operating portions.

6. The switch device according to claim 1, wherein the sensing portions of the detection are arranged respectively at the rear side and front side operating portions of the operating knob along the front-rear direction of the vehicle and detect contact or proximity of a human body.

7. The switch device according to claim 6, wherein each sensing portion comprises a detection electrode to detect capacitance.

8. The switch device according to claim 1, wherein the detection unit comprises sensing portions at a right side and a left side of the operating knob, and the protruding central portion of the operating knob has tapered sides in the front-rear direction of the vehicle to facilitate a recognition by an operator of whether the sensing portion at the right side or the left side of the operating knob is being touched.

9. The switch device according to claim 8, wherein each sensing portion comprises a detection electrode to detect capacitance.

\* \* \* \* \*